Oct. 6, 1970 R. M. STUDER ET AL 3,532,380

ENERGY ABSORBING DEVICE FOR A RESTRAINT BELT

Filed March 5, 1969

INVENTORS
Richard M. Studer, &
BY William J. Windscheif

Herbert Furman
ATTORNEY

United States Patent Office 3,532,380
Patented Oct. 6, 1970

3,532,380
ENERGY ABSORBING DEVICE FOR A
RESTRAINT BELT
Richard M. Studer, Rochester, and William J. Windscheif, Walled Lake, Mich., assignors to General Motors Corporation, Detroit, Mich., a corporation of Delaware
Filed Mar. 5, 1969, Ser. No. 804,536
Int. Cl. B60r 21/02, 21/10
U.S. Cl. 297—386                                     6 Claims

ABSTRACT OF THE DISCLOSURE

A restraint belt has a bight which is passed through an opening in a member and filled with collapsible material. The movement of the belt pulls the bight through the opening, crushing the collapsible material and forcing it through the opening to absorb energy in the belt until the belt reaches a limit position to stop movement of the belt.

---

This invention relates to restraint belts and, more particularly, to an energy absorbing device for restraint belts.

The energy absorbing device according to this invention utilizes the ability of a collapsible material to absorb energy as it is being extruded through an opening to absorb energy from a restraint belt. The collapsible material is inserted into a bight in the belt which extends through an opening in a support member to the one side. The collapsible material is maintained within the belt by a flanged channel mounted on the one side of the plate and forming with the side of the plate, a passageway.

It is, therefore, an object of this invention to provide a device wherein the energy is absorbed from a restraint belt by crushing a collapsible material. It is another object of this invention to provide an energy absorbing device wherein the energy from the restraint belt is absorbed by crushing a collapsible material and forcing it through a constrained opening. It is a further object of this invention to provide an energy absorbing device wherein the energy is absorbed by extruding a collapsible material up to a permissible limit of movement of the belt and then the belt is held fast. It is a further object of this invention to provide a restraint belt having a bight therein which is inserted through an opening in a support member and filled with a collapsible material so that any force applied to the belt will crush the collapsible material and extrude it through the opening to absorb energy.

These and other features and advantages of this invention will become readily apparent from the following detailed description and drawings wherein.

Figure 1:
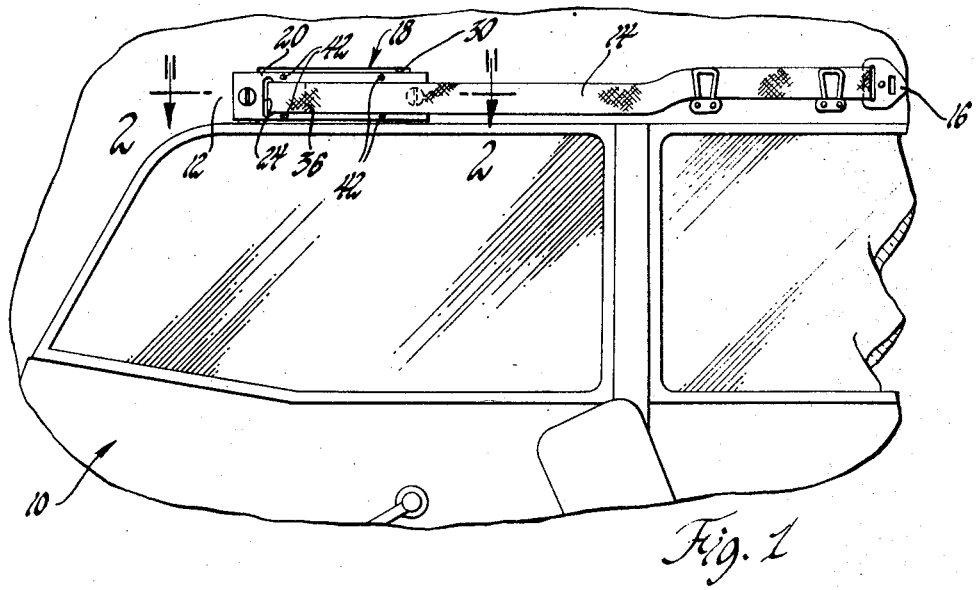
FIG. 1 is a partial view of the interior of a vehicle body showing a shoulder belt mounted thereto by an energy absorbing device according to this invention.

Referring now to FIG. 1, a vehicle body 10 includes a conventional hollow roof side rail 12 and a conventional shoulder belt 14 shown in the stored position and having a conventional D ring 16 at the free end thereof for attachment to a conventional mating floor mounted belt (not shown). An energy absorbing device 18 according to this invention both anchors the other end of the belt 14 to the side rail 12 and absorbs energy applied to the belt.

Figure 2:
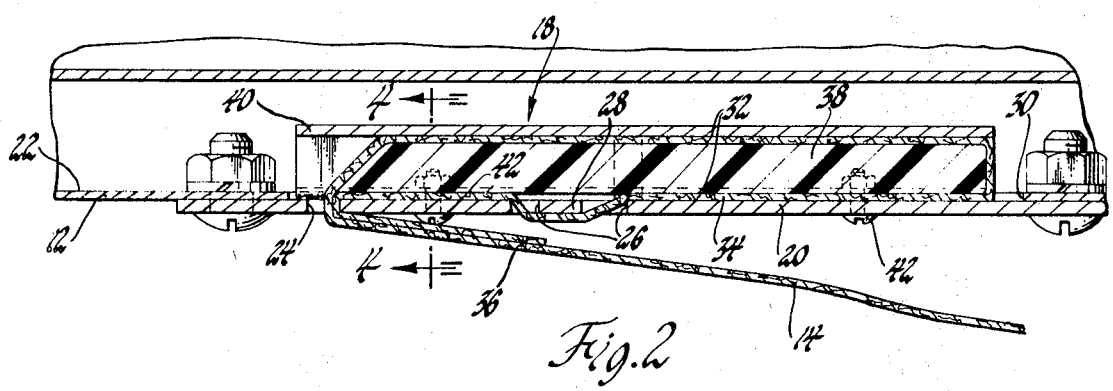
FIG. 2 is a sectional view taken along the lines 2—2 of FIG. 1.

Referring now to FIG. 2, a plate or support member 20 is bolted to the inner member 22 of the side rail 12. The member 20 has a slot or opening 24 near the left hand end and a pair of intermediate slots 26 to the right of the opening 24 which define a web 28. Opening 24 and slots 26 extend laterally of the support member 20 and open to the interior of the roof rail 12 through an elongated opening 30 in the member 22. The restraint belt 14 has a closed bight 32 in the other end thereof which extends through the openings 24 and 30 to the other side of the support member and within the roof rail 12. One leg 34 of the bight extends through the slots 26 and around the web 28 to anchor the bight through the support member 20 and keep the bight 32 from being completely pulled through the opening 24 as will later be described. Leg 34 is stitched at 36 to the belt 14 at the one side of the member 20.

Figure 4:
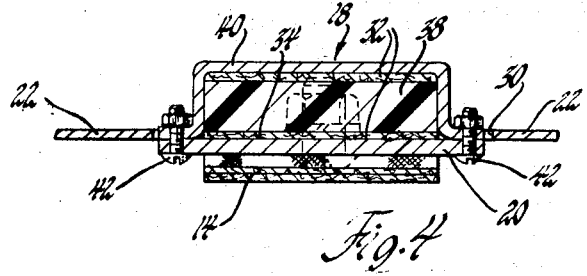

An elongated rectangular block 38 of collapsible material is inserted into the bight 32 of the belt 14 on the other side of the support member 20. The collapsible material may be Styrofoam, polystyrene, polypropylene or any other material which has a predictable rate of collapse. The width of the block 38 is generally equal to that of the belt 14 as shown in FIG. 4. Likewise the length of the opening 24 and the slots 26 is also generally equal to the width of the belt 14.

An elongated flanged channel 40 surrounds the bight 32 and the block 38 and has its flanges bolted at 42 to the support member 20. Channel 40 and the other side of the support member 20 form a passageway to constrain and maintain the block 38 of the collapsible material within the bight 32 and to guide the block 38 and the bight 32 toward the opening 24.

Figure 3:
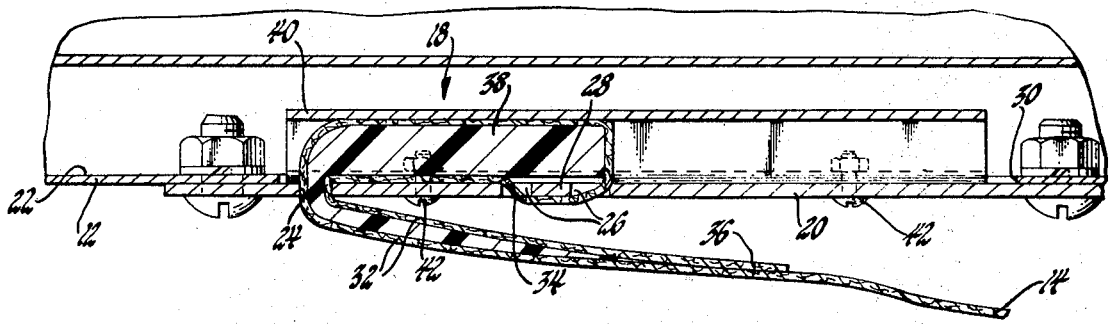
FIG. 3 is a similar view to FIG. 2 showing energy absorbing device after use; and, FIG. 4 is a sectional view taken generally along the lines 4—4 of FIG. 2.

When a force above a predetermined amount is applied to the belt 14, the bight 32 is pulled through the opening 24 until leg 34 bottoms against the web 28 as shown in FIG. 3. The bight 32 forms into a wedge shape at the opening 24 to crush the front portion of block 38 allowing the bight 32 and the crushed portion of the block 38 to extrude through opening 24. The crushing of the collapsible material and the friction between the bight 32 and the sides of the opening 34 and between the bight 32 and the support member 20 and the channel 40 slowly absorbs the energy of the force applied to the belt. After the collapsible material is extruded through the opening 24, it is on the one side of the plate 20 so that any reexpansion of the collapsible material occurs to the one side of the opening 24 where it exerts little influence on the belt 14 tending to return the belt through the opening. This phenomenon is best shown in FIG. 3 wherein the collapsible material is partially drawn through the opening 24 by the bight 32.

Depending upon the amount of force applied and the length of time over which the force is applied, the bight 32 may be only partially drawn through the opening 24 before the movement of the belt 14 is halted. A partially withdrawn bight 32 is shown in FIG. 3. If, however, the amount of force and the length of time the force is applied are sufficient to extrude all of the collapsible material and the bight 32, the bight 32 will bottom against the web 28 to hold the belt firmly against further movement.

Thus, an energy absorbing device according to this invention simply and efficiently absorbs the kinetic energy of a force applied to a restraint belt by crushing and extruding the collapsible material through an opening in a support member.

We claim:
1. An energy absorbing device for a vehicle restraint belt comprising, a member having an opening therein, a bight intermediate the end portions of the belt extending through the opening to one side of the member, the end portions of the belt remaining on the other side of the member, and collapsible means mounted in the bight and enlarging the bight to a size larger than the opening, movement of the bight through the opening crushing the collapsible means and forcing it through the opening to absorb energy.

2. An energy absorbing device for a vehicle restraint belt comprising, a support member having an opening therein, guide means on one side of the support member defining a passageway communicating with the opening and of a size larger than the opening, a bight intermediate the end portions of the belt extending through the opening and into the passageway, the end portions of the belt remaining on the other side of the support, and collapsible means mounted within the bight and enlarging the bight to the size of the passageway, movement of the bight through the opening being guided by the passageway and crushing the collapsible means to force it through the opening and absorb energy.

3. An energy absorbing device for a vehicle restraint belt comprising, a support member mounted to the vehicle, said support member having an opening therein, a closed bight in one end of the belt inserted through the opening to the one side of the member, the free end of the belt remaining on the other side of the member, collapsible means mounted in the bight and enlarging the bight to a size larger than the opening, movement of the bight through the opening crushing the collapsible means and forcing it through the opening to absorb energy, and stop means to keep the bight from pulling completely through the opening.

4. An energy absorbing device as recited in claim 3 including guide means surrounding the bight and the collapsible means on the one side of the support member to constrain the collapsible means within the bight and to guide the bight and the collapsible means toward the opening.

5. An energy absorbing device for a vehicle restraint belt comprising, a support member mounted to a vehicle and having an opening therein, an elongated channel member mounted to one side of the support member and extending over the opening to form with the one side of the support member a passageway which is of a size greater than the size of the opening, a closed bight in one end of the belt inserted through the opening and between the support member and the channel member, the free end of the belt remaining on the other side of the support member, elongated collapsible means mounted in the bight and enlarging the bight to the size of the passageway, movement of the bight through the opening being guided by the channel member and the support member down the passageway, crushing the collapsible means and forcing it through the opening to absorb energy, and stop means to keep the bight from pulling completely through the opening to limit the movement of the belt.

6. An energy absorbing device for a vehicle restraint belt comprising, a support member mounted to a vehicle and having a web portion and an opening therein, a closed bight in one end of the belt extending through the opening to the one side of the member, the free end of the belt remaining on the other side of the member, one leg of said bight passing around the web portion to anchor the belt to the support member, an elongated channel member mounted to the support member on the one side over the bight forming a passageway with the one side of the support member of a size larger than the opening, elongated collapsible means mounted in the bight in the channel member and enlarging the bight to the size of the passageway, movement of the bight through the opening guided by the passageway, crushing the collapsible means and forcing it through the opening to absorb energy until the bight bottoms against the web portion of the support member to limit the movement of the belt.

References Cited

UNITED STATES PATENTS 3,409,327   11/1968   Radke et al. _____ 297—386

LEO FRIAGLIA, Primary Examiner

R. R. SONG, Assistant Examiner

U.S. Cl. X.R.

280—150